W. C. MARGEDANT.

PLANING-MACHINE.

No. 6,851. Reissued Jan. 11, 1876.

WITNESSES:

W. W. Hollingsworth

Solon O. Kemon

INVENTOR:

Wm. C. Margedant

BY Munn & Co.

ATTORNEYS.

N. PETERS, PHOTO-LITHOGRAPHER, WASHINGTON, D. C.

UNITED STATES PATENT OFFICE.

WILLIAM C. MARGEDANT, OF HAMILTON, OHIO, ASSIGNOR TO BENTEL, MARGEDANT & CO.

IMPROVEMENT IN PLANING-MACHINES.

Specification forming part of Letters Patent No. 149,493, dated April 7, 1874; reissue No. 6,851, dated January 11, 1876; application filed December 14, 1875.

*To all whom it may concern:*

Be it known that I, WILLIAM C. MARGEDANT, of Hamilton, in the county of Butler and State of Ohio, have invented a new and useful Improvement in Planing-Machines; and I do hereby declare that the following is a full, clear, and exact description of the same, reference being had to the accompanying drawing forming part of this specification.

The invention relates to the pressure-bar or chip-breaker which is used in planing-machines for the purpose of holding down the timber, so that, as nearly as possible, a transversely-level surface may be presented to the revolving blades of the cutter, and the wood pressed down near the cutter-head against the lifting action of the cutter and the splintering of the wood. Pressure bars, which are rigid and inflexible and press upon the material as a whole, only touch the highest points of the material, which is always more or less uneven, in consequence of the warp and sinuosities. While the material, therefore, is pressed at some points, it is not even touched at others, and at such points a rigid pressure-bar is insufficient to prevent the splintering action before mentioned. To obviate this difficulty I construct my pressure-bar in sections of indefinite number and width, which sections are made hollow, with a continuous bar running therethrough each section, being made independently and automatically adjustable by any equivalent means.

Figure 1:
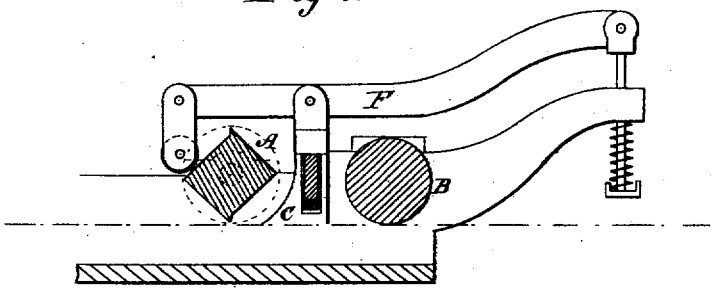
Figure 2:
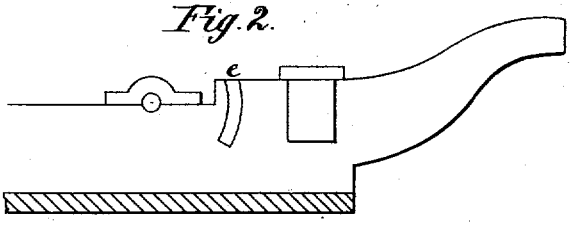
Figure 3:
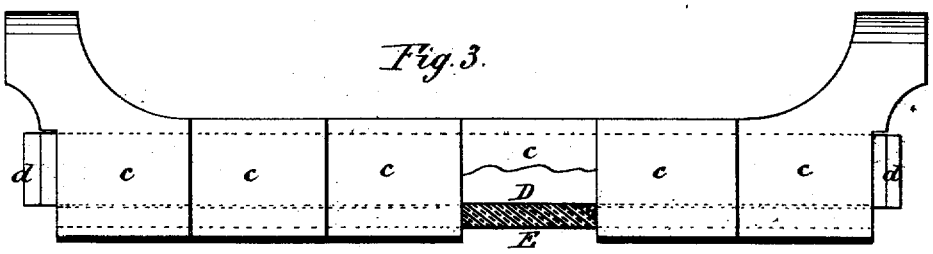
Figure 4:
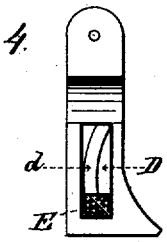

Figure 1 is a transverse section of a cutter-head, feed-roller, and my improved sectional pressure-bar, showing the relation of the latter to its co-operating parts; Fig. 2, a side view of one of the frame-pieces carrying the operating parts; Fig. 3, a front elevation of the sectional pressure-bar with one of the sections broken away, showing its inner construction. Fig. 4 is an end view of the pressure-bar.

A represents the rotary cutter of a planing-machine; B, the roller that takes out to some extent the warp, and C the intermediate chip-breaker or pressure-bar. I make the latter in hollow sections *c*, that may be slid on or off a bar, D. Between the bar and the sections is inserted a long rubber strip, E, that yields at different points, according to the backward pressure of each section. This pressure-bar is pivoted to the levers F F, and held by spring-pressure, while the ends *d d* of the bar D move in the arc-grooves *e* of the frame-pieces, thus always clearing the cutter-blades.

By this construction a pressure adapted to the varied conformation of the transverse surface of the timber is provided, a more uniform cut obtained, and the resistance to the cutter considerably lessened.

Having thus described my invention, what I claim is—

1. A pressure-bar for planing-machines, consisting of adjustable bar D and hollow sections *c*, substantially as set forth.

2. The combination, in a pressure-bar for planing-machines, of the bar D, sections *c*, and spring E, substantially as set forth.

3. A sectional pressure-bar for planing-machines, composed of bar D and hollow sections *c*, in combination with spring-held levers F F, substantially as set forth.

The above specification of my invention signed by me this 14th day of December, 1875.

WM. C. MARGEDANT.

Witnesses:
EDWD. W. BYRN,
SOLON C. KEMON.